US012018690B2

(12) United States Patent
Finidori

(10) Patent No.: US 12,018,690 B2
(45) Date of Patent: Jun. 25, 2024

(54) VARIABLE MECHANICAL AUTOMOTIVE COOLANT PUMP

(71) Applicant: PIERBURG PUMP TECHNOLOGY GMBH, Neuss (DE)

(72) Inventor: Laurent Finidori, Bertrange (FR)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 0 days.

(21) Appl. No.: 18/030,071

(22) PCT Filed: Oct. 6, 2020

(86) PCT No.: PCT/EP2020/078000
§ 371 (c)(1),
(2) Date: Apr. 4, 2023

(87) PCT Pub. No.: WO2022/073589
PCT Pub. Date: Apr. 14, 2022

(65) Prior Publication Data

US 2023/0358239 A1 Nov. 9, 2023

(51) Int. Cl.

| | |
|---|---|
| ***F04D 15/00*** | (2006.01) |
| ***F01P 5/10*** | (2006.01) |
| ***F01P 7/14*** | (2006.01) |
| ***F04D 29/02*** | (2006.01) |
| ***F04D 29/08*** | (2006.01) |
| ***F04D 29/46*** | (2006.01) |

(52) U.S. Cl.
CPC ............ *F04D 15/0038* (2013.01); *F01P 5/10* (2013.01); *F01P 7/14* (2013.01); *F04D 15/0022* (2013.01);
(Continued)

(58) Field of Classification Search
CPC ............ F04D 15/0038; F04D 15/0022; F04D 29/026; F04D 29/086; F04D 29/468;
(Continued)

(56) References Cited

U.S. PATENT DOCUMENTS 3,784,215 A 1/1974 Ruthenberg
3,784,318 A * 1/1974 Davis .................... F04D 29/468 415/164

(Continued)

FOREIGN PATENT DOCUMENTS

DE 20 2017 103 401 U1 10/2018
WO WO 2012/116676 A1 9/2012

(Continued)

*Primary Examiner* — Courtney D Heinle
*Assistant Examiner* — Andrew J Marien
(74) *Attorney, Agent, or Firm* — Norman B. Thot

(57) ABSTRACT

A variable mechanical automotive coolant pump includes a rotatable rotor shaft, an impeller wheel which is co-rotatably connected with the rotor shaft, a static guiding cylinder, a control sleeve, and at least one guiding device. The impeller wheel has a discharging radial outside. The control sleeve has a hollow-cylindrical control sleeve body having a radial outside. The control sleeve does not rotate and is guided axially slidable within the static guiding cylinder so as to regulate a flow rate of the variable mechanical automotive coolant pump by closing or opening the discharging radial outside of the impeller wheel. The at least one guiding device guides the radial outside of the control sleeve within the static guiding cylinder.

10 Claims, 2 Drawing Sheets

(52) U.S. Cl.
CPC ......... *F04D 29/026* (2013.01); *F04D 29/086* (2013.01); *F04D 29/468* (2013.01); *F01P 2007/143* (2013.01); *F01P 2007/146* (2013.01); *F05D 2270/56* (2013.01); *F05D 2270/64* (2013.01)

(58) Field of Classification Search
CPC .......... F01P 5/10; F01P 7/14; F01P 2007/143; F01P 2007/146; F05D 2270/56; F05D 2270/64
See application file for complete search history.

(56) References Cited

U.S. PATENT DOCUMENTS

| | | | | |
|---|---|---|---|---|
| 4,070,132 | A * | 1/1978 | Lynch | F04D 15/0038 415/48 |
| 4,802,817 | A * | 2/1989 | Tyler | F01D 17/143 415/49 |
| 8,061,716 | B2 * | 11/2011 | Wirt | F16J 9/14 277/497 |
| 2016/0215679 | A1 * | 7/2016 | Pawellek | F04D 29/4293 |
| 2016/0258340 | A1 * | 9/2016 | Klippert | F01P 7/14 |
| 2018/0320695 | A1 * | 11/2018 | Zielberg | F04D 15/0038 |
| 2022/0099016 | A1 * | 3/2022 | Finidori | F01P 7/161 |

FOREIGN PATENT DOCUMENTS

| | | | |
|---|---|---|---|
| WO | WO 2017/076647 | A1 | 5/2017 |
| WO | WO 2019/042530 | A1 | 3/2019 |

* cited by examiner

VARIABLE MECHANICAL AUTOMOTIVE COOLANT PUMP

CROSS REFERENCE TO PRIOR APPLICATIONS

This application is a U.S. National Phase application under 35 U.S.C. § 371 of International Application No. PCT/EP2020/078000, filed on Oct. 6, 2020. The International Application was published in English on Apr. 14, 2022 as WO 2022/073589 A1 under PCT Article 21(2).

FIELD

The present invention is directed to a variable mechanical automotive coolant pump.

BACKGROUND

A coolant pump is used for providing and regulating the coolant flow to cool an internal combustion engine, and to thereby prevent an overheating of the engine components. The coolant pump is mechanically coupled with the crankshaft of the internal combustion engine, for example, via a belt drive. Due to the constant transmission ratio, the rotational speed of the coolant pump rotor is always proportional to the rotational speed of the crankshaft, but not to the cooling performance requirement of the internal combustion engine. Variable mechanical automotive coolant pumps have therefore become more and more common.

One type of a variable mechanical automotive coolant pump is provided with a switchable clutch to uncouple the drive shaft of the pump from the belt drive which is driven by the crankshaft of the internal combustion engine if no coolant circulation is requested.

WO 2019/042530 A1 describes an alternative pump type of a variable mechanical automotive coolant pump with an axially slidable control sleeve which defines a valve. For reducing the flow rate of the pump, the axially slidable control sleeve can close the radial discharging area of an impeller wheel within the pump, which is mechanically driven by the crankshaft of the internal combustion engine via a belt drive. The hollow cylindrical control sleeve can be pushed over the impeller wheel covering the radial discharging area of the impeller wheel according to the required coolant flow rate. The radial discharging area of the impeller wheel can also be closed completely with this control sleeve to thereby completely hydraulically block the coolant pump during the cold-start phase of the engine.

The control sleeve is actuated by a hydraulic actuation system which is provided with pressurized coolant from the pumping chamber. The leakage between the outer cylinder surface of the control sleeve and the inner cylinder surface of the guiding cylinder must be very low to provide a constant pressure level within the hydraulic control chamber. A small hydraulic gap between the contact surfaces is therefore necessary. The requirements regarding the manufacturing accuracy of the control sleeve and the guiding cylinder are accordingly high, which results in a cost-intensive production of the components.

The control sleeve is made of a metallic material due to the high accuracy requirements. The guiding cylinder within the pump housing is also made of a metallic material which has the effect that the wear between the machined metallic contact surfaces is high. The wear can additionally be increased by an inaccurate guiding of the control sleeve, resulting in a tilting of the control sleeve within the guiding cylinder. The tilting of the control sleeve can be caused, for example, by pressure fluctuations, by pollution particles within the coolant, or by an imprecise manufacturing process of the contact surfaces of the components.

The inner cylinder surface of the guiding cylinder and the outer cylinder surface of the control sleeve are provided with a wear resistant coating to reduce wear.

The high accuracy requirements and the additional wear-resistant coating result in a cost-intensive production process of the coolant pump.

SUMMARY

An aspect of the present invention is to provide a cost-effective and reliable automotive coolant pump.

In an embodiment, the present invention provides a variable mechanical automotive coolant pump which includes a rotor shaft which is configured to rotate, an impeller wheel which is co-rotatably connected with the rotor shaft, a static guiding cylinder, a control sleeve, and at least one guiding device. The impeller wheel comprise a discharging radial outside. The control sleeve comprises a hollow-cylindrical control sleeve body having a radial outside. The control sleeve is configured to be non-rotatable and to be guided axially slidable within the static guiding cylinder so as to regulate a flow rate of the variable mechanical automotive coolant pump by closing or opening the discharging radial outside of the impeller wheel. The at least one guiding device is configured to guide the radial outside of the control sleeve within the static guiding cylinder.

BRIEF DESCRIPTION OF THE DRAWINGS

The present invention is described in greater detail below on the basis of embodiments and of the drawings in which.

DETAILED DESCRIPTION

Figure 1:
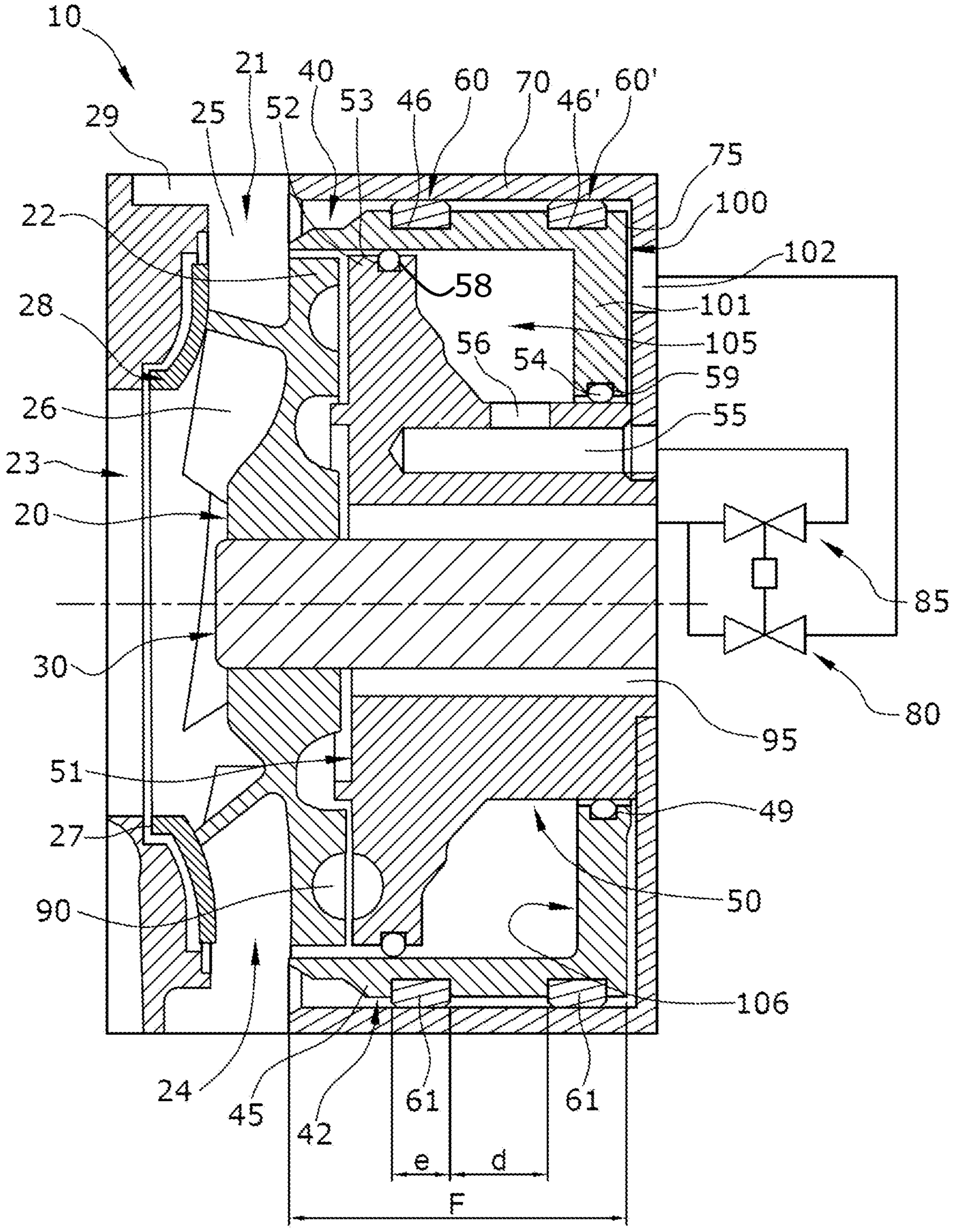
FIG. 1 shows a schematic longitudinal cross section of a variable mechanical automotive coolant pump comprising a control sleeve according to the present invention.

The variable mechanical automotive coolant pump according to the present invention is provided with a rotatable impeller wheel which is co-rotatably connected with a rotatable rotor shaft, which is, for example, mechanically driven by the belt drive of an internal combustion engine.

The variable mechanical automotive coolant pump according to the present invention is also provided with a non-rotatable and axially slidable control sleeve with a hollow-cylindrical control sleeve body which is guided by and within a static guiding cylinder, which is, for example, machined and defined within a casted static pump housing.

According to the present invention, the variable mechanical automotive coolant pump is provided with a separate guiding device to guide the slidable control sleeve within an inner cylinder surface of the static guiding cylinder. The guiding device substantially surrounds the outer cylinder surface of the control sleeve substantially over the complete circumference thereof so that the outer cylinder surface of the control sleeve is not in direct contact with the inner cylinder surface of the static guiding cylinder.

The radial extension of the substantially cylindrical gap between the outer cylinder surface of the control sleeve and the inner cylinder surface of the static guiding cylinder can, for example, be at least 0.5 mm.

With the application of the separate guiding device, the friction pairing between the sliding surface of the static guiding cylinder and the guiding device is freely selectable, so that both the control sleeve and the guiding device can be provided with the optimal material according to their individual functions. A plastic guiding device providing low friction forces and high sealing characteristics could, for example, be combined with a metallic control sleeve of high strength and high form stability.

In an embodiment of the present invention, the axial position of the control sleeve regulating the discharging flow rate of the impeller wheel can, for example, be continuously adaptable.

The actuation of the control sleeve can be achieved by different types of actuation systems and can, for example, be provided with a hydraulic actuation system. The hydraulic actuation system is provided with a hydraulic control chamber which is fluidically effective to an axial end surface of the control sleeve. The hydraulic pressure force axially pushes the control sleeve over the impeller wheel, thereby closing the radial discharging area of the impeller wheel. The high hydraulic pressure for hydraulically actuating the control sleeve can, for example, be provided by an additional side channel pump rotor arrangement at the backside of the impeller wheel. Because of this high hydraulic pressure, the control quality of the hydraulic control chamber substantially depends on the sealing quality of the separate guiding device, so that the hydraulic quality of the guiding device is important for a precise hydraulic actuation of the control slider.

The return mechanism of the control sleeve can be realized by a spring supported return mechanism or by providing a second hydraulic control chamber, for example, defined by an inner static supporting device and an axial end surface on the opposite side of the first axial end surface of the control sleeve. The pump can thus be actuated purely hydraulically so that no additional electric motor is necessary to provide the high actuation forces.

In an embodiment of the present invention, the guiding device can, for example, be defined by a non-closed ring-shaped guiding device body which is provided with a compensation slit. This compensation slit allows an adaption of the total circumference of the ring-shaped guiding device body to geometric inaccuracies of the sliding surfaces. To equalize tolerance-related inequalities, the shape and the dimensions of the guiding device body can adapt to the shape and the dimensions of the inner guiding cylinder surface. The compensation slit also allows for the adaption to geometric variations resulting from thermal expansion differences between the control sleeve and the static guiding cylinder.

In an embodiment of the present invention, the axial extension of the guiding device can, for example, be smaller than 25% of the total axial extension of the control sleeve, so that the control sleeve is not guided over the complete outer cylinder surface. This results in a reduction of the sliding contact surface, so that the friction between the guiding device and the static guiding cylinder is relatively low. The low friction forces allow for relatively low hydraulic actuation forces, so that the power consumption of the actuation system of the coolant pump is reduced, resulting in an increased efficiency of the pump. The lower hydraulic actuation forces also result in a lower hydraulic pressure in the hydraulic control chambers which increases the sealing efficiency of the guiding device and reduces the leakage over the guiding device.

In an embodiment of the present invention, the control sleeve can, for example, be guided by two separate guiding devices, for example, by exactly two guiding devices, so as to provide a statically determined system with one degree of freedom in the sliding direction. The guiding devices can, for example, be arranged with a distance to each other of at least the axial extension of one guiding device between the two guiding devices. The application of two distant guiding devices avoids a relevant tilting of the control sleeve within the static guiding cylinder.

The guiding device body can, for example, be provided with a labyrinth-type compensation slit. This labyrinth-type compensation slit comprises two axially oriented slit parts each extending from both axial end surfaces of the guiding device body and a circumferentially oriented slit part connecting the two axially oriented slit parts. The slit width of the circumferentially oriented slit part is very small to avoid relevant leakages of the coolant over the guiding device. The slit width of the circumferentially oriented slit part can also be substantially zero. The slit width of the axially oriented slit parts is larger than the slit width of the circumferentially oriented slit part to allow the adaption of the ring-shaped guiding device body to manufacturing inaccuracies and thermal expansion differences between the control sleeve and the static guiding cylinder.

In an embodiment of the present invention, the guiding device can, for example, be embedded in the control sleeve body. The control sleeve body can, for example, be provided with a ring groove in the outer cylinder surface of the control sleeve body for fixing the guiding device. The guiding means body radially extends the outer cylinder surface of the control sleeve by at least 20% of the radial thickness of the guiding device body so that the guiding device is not completely embedded in the control sleeve. The guiding device thereby prevents the control sleeve from contacting the static guiding cylinder. The groove ground surface supports the guiding device radially, and the sidewalls of the groove prevent the guiding device from sliding axially along the outer cylinder surface of the control sleeve. The groove sidewalls also increase the sealing efficiency by providing an additional labyrinth-type gap between the guiding device and the groove surfaces in an axial direction. The sealing efficiency is provided by the sidewalls of the groove even if the guiding device does not completely contact the groove ground surface resulting from the adaption of the guiding device to the inner cylinder surface of the guiding cylinder.

In an embodiment of the present invention, the guiding device can, for example, be made of a plastic material. Many plastic materials are characterized by good sliding characteristics and a low friction coefficient in combination with metallic materials, which reduces the sliding friction and the resulting wear of the sliding contact surfaces of the components. The good sliding characteristics of a plastic guiding device also results in low hydraulic actuation forces, thereby reducing the hydraulic pressure in the hydraulic control chambers.

Many plastic materials are provided with a high elastic deformability, so that a plastic guiding device easily adapts to the shape and the dimensions of the inner cylinder surface of the static guiding cylinder, thereby increasing the guiding quality and the sealing efficiency. The manufacturing precision of the static guiding cylinder can thereby be reduced to save on production costs of the coolant pump.

The application of a plastic guiding device instead of a cost intensive wear resistant coating in combination with lower manufacturing precision requirements results in significantly increased cost-efficiency of the manufacturing process of the coolant pump.

In an embodiment of the present invention, the slidable control sleeve can, for example, be made of an aluminum-based material. Aluminum-based materials are characterized by a low density resulting in a low weight, which reduces the weight of the coolant pump. Aluminum-based materials are have a high strength and high form stability.

An embodiment of the present invention is described below under reference to the enclosed drawings.

FIG. 1 shows a variable mechanical automotive coolant pump 10, for example, for providing an internal combustion engine with liquid coolant. The coolant pump 10 comprises an impeller wheel 20 which is co-rotatably connected to a rotor shaft 30. The rotor shaft 30 can, for example, be driven by the belt drive of the internal combustion engine. The coolant pump 10 further comprises a non-rotatable and axially slidable control sleeve 40, with a hollow cylindrical control sleeve body 45 comprising two separate guiding devices 60, 60' which are each defined by a non-closed and ring-shaped guiding device body 61. The guiding device body 61 slidably supports the control sleeve 40 within and at a static guiding cylinder 70. The coolant pump 10 also comprises a static inner supporting cylinder 50 which guides the radial inside of the control sleeve 40.

The impeller wheel 20 is arranged within a pumping chamber 25 and comprises a circular disc-type impeller body 22 with a plurality of integrally formed impeller blades 26 which are substantially radially oriented in a fan-type arrangement. The axial front suction side 23 of the impeller wheel 20 is partially covered by a cover ring 28 which is co-rotatably connected to the impeller blades 26. At the axial front suction side 23, the cover ring 28 is provided with a cylindrical protrusion 27 which defines an axial central inlet for the liquid coolant. The rotating impeller blades 26 sucks liquid coolant from the axial front suction side 23 of the coolant pump 10 through the cylindrical protrusion 27 within the cover ring 28. Due to the centrifugal forces, the impeller blades 26 accelerate the liquid coolant radially outwardly. The liquid coolant is discharged through a radial discharge ring-opening 24 defined by the cover ring 28 and the impeller body 22 into the outlet volute 29 circumferentially enclosing the impeller wheel 20.

The axially slidable hollow cylindrical control sleeve body 45 is provided with two supporting ring grooves 46, 46' for radially supporting and axially fixing the non-closed ring-shaped guiding device body 61. The two guiding devices 60, 60' guide the control sleeve 40 within the static guiding cylinder 70 and fluidically separate a first hydraulic control chamber 100 and the pumping chamber 25.

The control sleeve 40 is actuated by pressurizing a first hydraulic control chamber 100 with pressurized coolant entering through an inlet 102 in the axial end surface 75 of the static guiding cylinder 70, so that a hydraulic pressure force at an axial end surface 101 of the control sleeve 40 is applied. The applied high hydraulic pressure force pushes the hollow-cylindrical control sleeve body 45 in a closing direction over the impeller wheel 20, so that the radial discharge ring-opening 24, and thereby the discharging radial outside 21, is closed to hydraulically block the coolant pumping.

The inside of the control sleeve 40 is supported by an static inner supporting cylinder 50 which defines a second hydraulic control chamber 105 within the hollow cylindrical control sleeve body 45. The second hydraulic control chamber 105 is sealed by two sealing rings 58, 59. One sealing ring 58 is arranged in a corresponding groove 53 at the outer cylinder surface 52 of the static inner supporting cylinder 50. The other sealing ring 59 is arranged in a corresponding groove 54 at the inner cylinder surface 49 of the hollow cylindrical control sleeve body 45. For actuating the control sleeve 40, the second hydraulic control chamber 105 can be pressurized with coolant entering through an inlet 56 which is connected with an eccentric and axially oriented bore 55 within the static inner supporting cylinder 50 so as to provide an opposite hydraulic pressure force at a second axial end surface 106 of the hollow cylindrical control sleeve body 45. This opposite hydraulic pressure force pushes the control sleeve 40 in an opposite opening direction for opening the radial discharge ring-opening 24 of the impeller wheel 20.

The hydraulic pressure for actuating the control sleeve 40 is provided by a side channel pump 90 defined by and at the backside of the impeller wheel 20 and by the opposite axial end surface 51 of the static inner supporting cylinder 50. The pressurized coolant flows through a ring channel 95 between the static inner supporting cylinder 50 and the rotating rotor shaft 32 to two electromagnetic pressure control valves 80, 85 which is fluidically connected in parallel. The electromagnetic pressure control valves 80, 85 regulate the hydraulic pressure within each hydraulic control chamber 100, 105 to adapt the axial position of the control sleeve 40 to the cooling performance requirements of the cooling system. The first electromagnetic pressure control valve 80 fluidically connects the inlet 102 of the first hydraulic control chamber 100 with the ring channel 95 which is provided with pressurized coolant from the side channel pump 90. The second electromagnetic pressure control valve 85 fluidically connects the inlet 56 of the second hydraulic control chambers 105 with the ring channel via a bore 55 in the static inner supporting cylinder 50.

Figure 2:
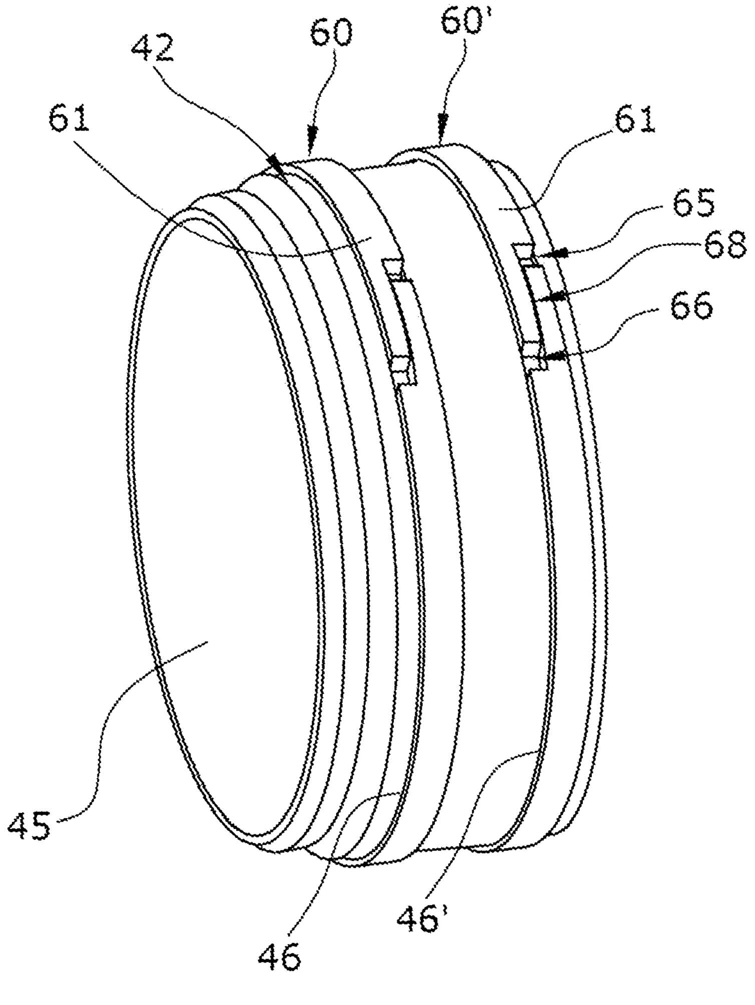
FIG. 2 shows a schematic perspective view of the control sleeve of FIG. 1.

FIG. 2 shows the schematic perspective view of the control sleeve 40 with the hollow cylindrical control sleeve body 45 and the two guiding devices 60 and 60' which are respectively defined by a non-closed ring-shaped guiding device body 61. The guiding device body 61 is made of a plastic material, for example, Iglidur® H370. Each guiding device body 61 is arranged within a corresponding supporting ring groove 46, 46' at the outer cylinder surface 42 of the aluminum hollow cylindrical control sleeve body 45 to radially support the guiding device body 61 and to axially secure the guiding device body 61 against axial displacement. The two guiding devices 60, 60' are arranged with an axial distance d of about 150% of the axial extension e of the guiding device body 61. The axial extension e of the two guiding devices 60, 60' is here less than 25% of an axial extension F of the control sleeve 40.

The guiding device body 61 is provided with a labyrinth-type compensation slit comprising two axially oriented slit parts 65, 66 and a circumferentially oriented slit part 68. Each axially oriented slit part 65, 66 extends axially from one of the two axial end surfaces of the guiding device body 61. The circumferential oriented slit part 68 connects the two axially oriented slit parts 65, 66, so that the guiding device body 61 is not completely mechanically closed. The slit width of the axially oriented slit parts 65, 66 is larger than the width of the circumferentially oriented slit part 68. The axial oriented slit parts 65, 66 allow an adaption of the circumferential dimension of the guiding device body 61 to compensate geometric variations resulting from imprecise manufacturing and thermal expansion between the control sleeve 40 and static guiding cylinder 70. The circumferentially oriented slit part 68 is very small or can be substantially zero to avoid relevant leakages over the two guiding devices 60, 60'. As a result, the mechanically not closed and thereby adaptable guiding device body 61 is, however, closed hydraulically.

The present invention is not limited to embodiments described herein; reference should be had to the appended claims.

LIST OF REFERENCE NUMERALS

10 Variable mechanical automotive coolant pump
20 Impeller wheel
21 Discharge radial outside
22 Impeller body
23 Axial front suction side
24 Radial discharge ring-opening
25 Pumping chamber
26 Impeller blades
27 Cylindrical protrusion
28 Cover ring
29 Outlet volute
30 Rotor shaft
40 Control sleeve
42 Outer cylinder surface
45 Hollow cylindrical control sleeve body
46 Supporting ring groove
46' Supporting ring groove
49 Inner cylinder surface
50 Static inner supporting cylinder
51 Opposite axial end surface
52 Outer cylinder surface
53 Groove
54 Groove
55 Bore
56 Inlet
58 Sealing ring
59 Sealing ring
60 Guiding device
60' Guiding device
61 Guiding device body
65 Axially oriented slit part
66 Axially oriented slit part
68 Circumferentially oriented slit part
70 Static guiding cylinder
75 Axial end surface
80 First electromagnetic pressure control valve
85 Second electromagnetic pressure control valve
90 Side channel pump
95 Ring channel
100 First hydraulic control chamber
101 Axial end surface
102 Inlet
105 Second hydraulic control chamber
106 Second axial end surface
d Axial distance between guiding devices 60, 60'
e Axial extension of the guiding device 60
F Axial extension of control sleeve 40

What is claimed is:

1. A variable mechanical automotive coolant pump comprising:

a rotor shaft which is configured to rotate;

an impeller wheel which is co-rotatably connected with the rotor shaft, the impeller wheel comprising a discharging radial outside;

a static guiding cylinder;

a control sleeve comprising a hollow-cylindrical control sleeve body having a radial outside, the control sleeve being configured to be non-rotatable and to be guided axially slidable within the static guiding cylinder so as to regulate a flow rate of the variable mechanical automotive coolant pump by closing or opening the discharging radial outside of the impeller wheel; and at least one guiding device which is configured to guide the radial outside of the control sleeve within the static guiding cylinder, wherein, each of the at least one guiding device directly contacts the static guiding cylinder.

2. The variable mechanical automotive coolant pump as recited in claim 1, wherein an axial position of the control sleeve is continuously adaptable so that an open cross-sectional area of the discharging radial outside of the impeller wheel is fully variable.

3. The variable mechanical automotive coolant pump as recited in claim 1, further comprising:

a hydraulic actuation system comprising a hydraulic control chamber, the hydraulic actuation system being configured to actuate the control sleeve.

4. The variable mechanical automotive coolant pump as recited in claim 1, wherein the at least one guiding device is defined by a non-closed ring-shaped guiding device body which comprises a compensation slit.

5. The variable mechanical automotive coolant pump as recited in claim 4, wherein the compensation slit of the non-closed ring-shaped guiding device body is a labyrinth-type compensation slit.

6. The variable mechanical automotive coolant pump as recited in claim 1, wherein, the at least one guiding device has an axial extenuation, the control sleeve has an axial extension, and the axial extension of the at least one guiding device is <25% of the axial extension of the control sleeve.

7. The variable mechanical automotive coolant pump as recited in claim 1, wherein, the variable mechanical automotive coolant pump comprises two of the at least one guiding device each of which directly contacts the static guiding cylinder, and the control sleeve is guided by each of the two guiding devices.

8. The variable mechanical automotive coolant pump as recited in claim 1, wherein the at least one guiding device is embedded in the hollow-cylindrical control sleeve body.

9. The variable mechanical automotive coolant pump as recited in claim 1, wherein the at least one guiding device is made of a plastic material.

10. The variable mechanical automotive coolant pump as recited in claim 1, wherein the control sleeve is made of an aluminum-based material.

* * * * *